(No Model.) 4 Sheets—Sheet 1.

S. W. HOAG, Sr.
PISTON WATER METER AND REGISTER.

No. 255,289. Patented Mar. 21, 1882.

Witnesses:
E. A. Hemmenway
Walter E. Lombard.

Inventor:
S. W. Hoag Sr.
by N. C. Lombard
Attorney.

(No Model.) 4 Sheets—Sheet 2.

S. W. HOAG, Sr.
PISTON WATER METER AND REGISTER.

No. 255,289. Patented Mar. 21, 1882.

Witnesses:
E. A. Hemmenway
Walter E. Lombard

Inventor:
Sidney W. Hoag Sr.
by N. C. Lombard
Attorney.

(No Model.) 4 Sheets—Sheet 3.

S. W. HOAG, Sr.
PISTON WATER METER AND REGISTER.

No. 255,289. Patented Mar. 21, 1882.

Witnesses:
E. A. Hemmenway
Walter E. Lombard

Inventor.
S. W. Hoag Sr.
by N. C. Lombard
Attorney.

(No Model.) 4 Sheets—Sheet 4.

S. W. HOAG, Sr.
PISTON WATER METER AND REGISTER.

No. 255,289. Patented Mar. 21, 1882.

Witnesses:
E. A. Hemmenway
Walter E. Lombard

Inventor:
Sidney W. Hoag Sr.
by N. C. Lombard
Attorney.

UNITED STATES PATENT OFFICE.

SIDNEY W. HOAG, SR., OF NEW YORK, N. Y., ASSIGNOR OF ONE HALF TO HENRY B. PIPER, OF SAME PLACE.

PISTON WATER METER AND REGISTER.

SPECIFICATION forming part of Letters Patent No. 255,289, dated March 21, 1882.

Application filed August 15, 1881. (No model.)

*To all whom it may concern:*

Be it known that I, SIDNEY W. HOAG, Sr., of New York, in the county of New York and State of New York, have invented certain new and useful Improvements in Water-Meters, of which the following, taken in connection with the accompanying drawings, is a specification.

My invention relates to that class of water-meters in which two reciprocating pistons are used, so arranged relative to the valves, that the piston of each cylinder operates and controls the valve or valves of the other cylinder; and it consists in a novel construction and arrangement of the cylinders, valves, valve-gear, and registering apparatus, which will be best understood by reference to the description of the drawings and to the claims to be hereinafter given.

Figure 1:
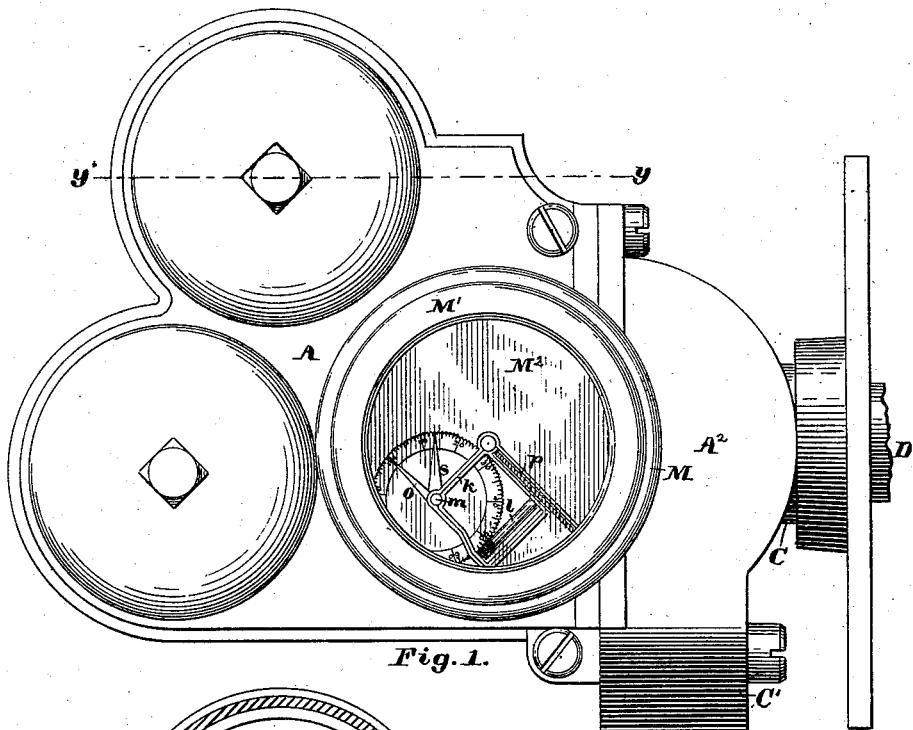
Figure 2:
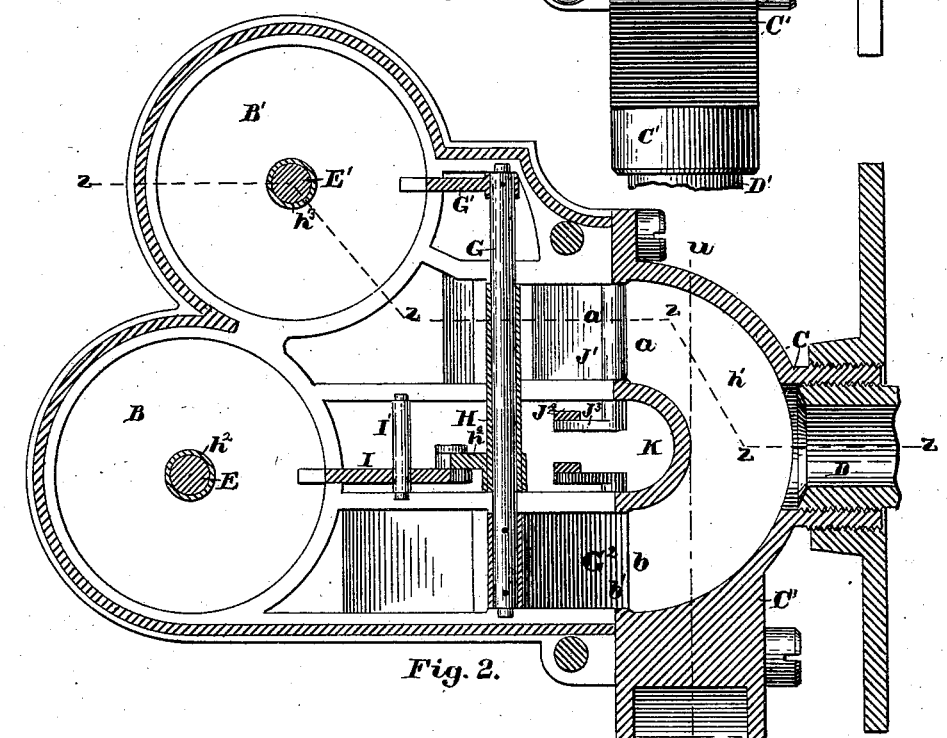
Figure 3:
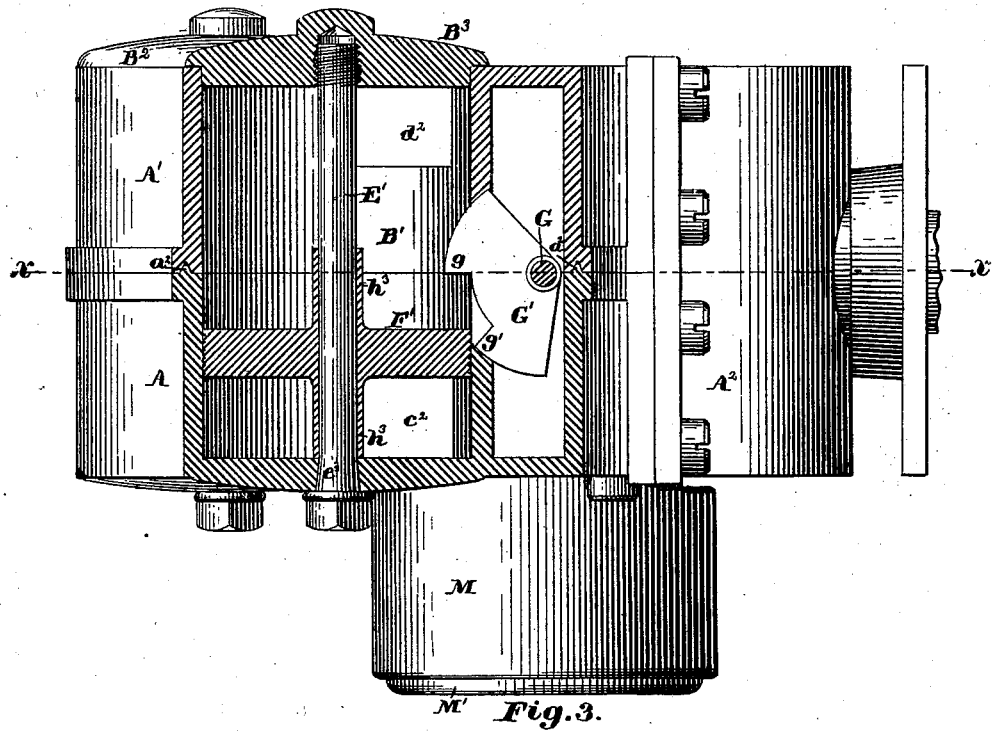
Figure 4:
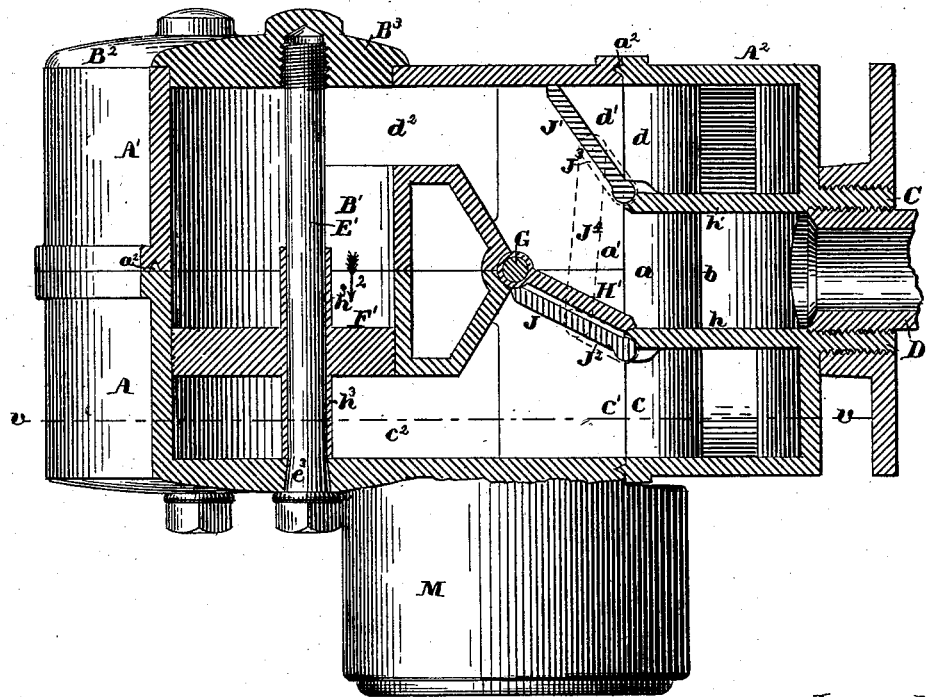
Figure 6:
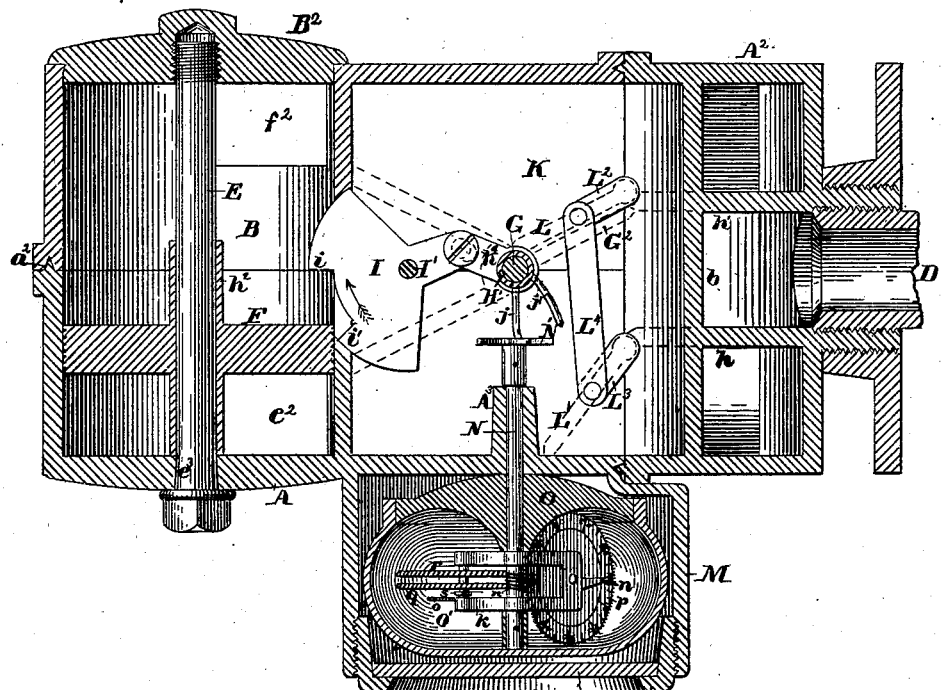
Figure 5:
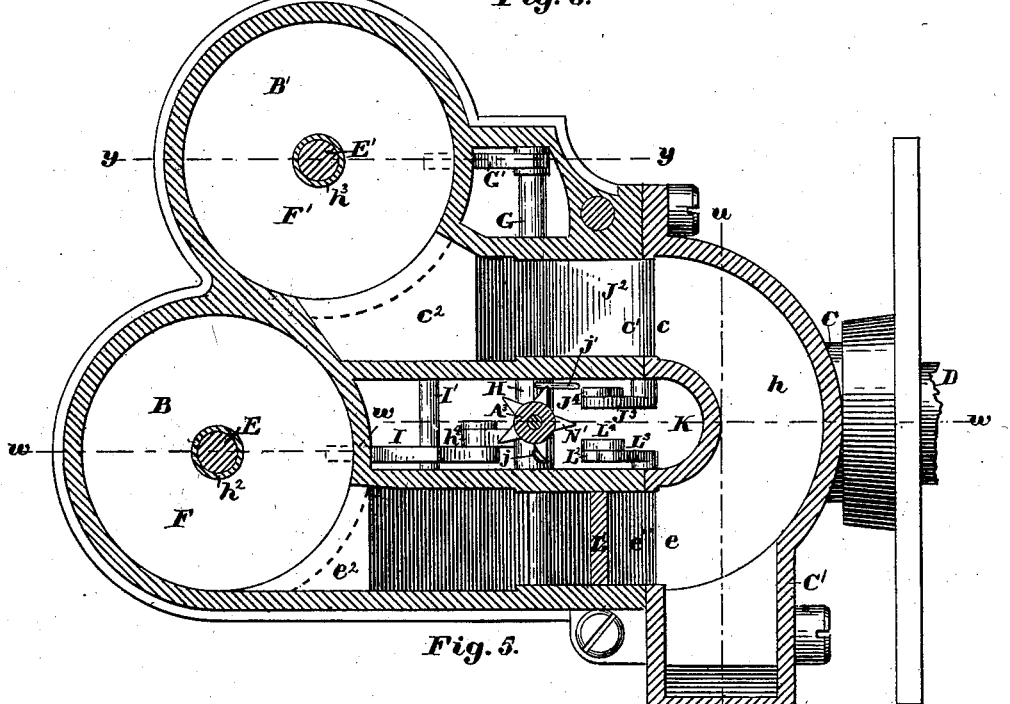
Figure 7:
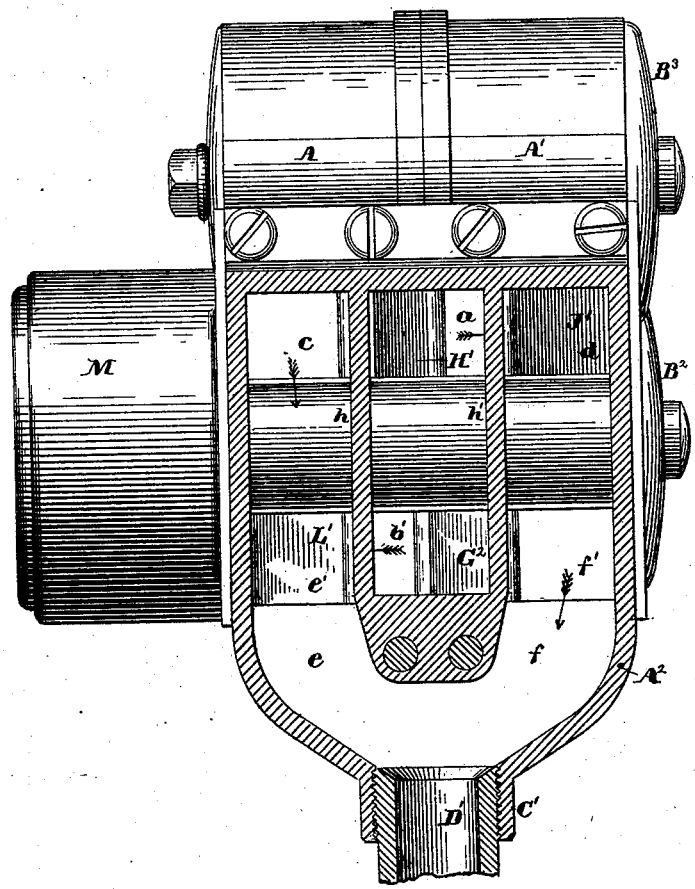

Figure 1 of the drawings is a side elevation of my improved water meter. Fig. 2 is a vertical section on line $x\ x$ on Fig. 3. Fig. 3 is a sectional plan, the cutting-plane being on line $y\ y$ on Figs. 1 and 5. Fig. 4 is a horizontal section on line $z\ z$ on Fig. 2. Fig. 5 is a vertical section on line $v\ v$ on Fig. 4. Fig. 6 is a horizontal section on line $w\ w\ w$ on Fig. 5, and Fig. 7 is a vertical section on line $u\ u$ on Figs. 2 and 5.

The main body of the meter is composed of three principal castings, A, A', and A², the joint between the two castings A and A' being at right angles to the joint between said castings and the casting A², and said joints being rendered water-tight by means of V-35 shaped projecting tongues $a^2$ and correspondingly-shaped grooves to receive said tongues, as shown in Figs. 3 and 4.

B and B' are the two cylinders arranged parallel with each other and with their axes at right angles to the joint between the two castings A and A', so that one-half of the length of each of said cylinders is formed within each of said castings, A and A'.

The casting A² has formed thereon the bosses or hubs C and C', to receive the inlet and discharge pipes D and D', respectively, and is divided by the partitions $h$ and $h'$ into the induction-passages $a$ and $b$, and the eduction-passages $c$, $d$, $e$, and $f$, which coincide with corresponding passages $a'$, $b'$, $c'$, $d'$, $e'$, and $f'$, formed in the contiguous face of one or the other of the castings A or A', when the castings A, A', and A² are bolted together. One of the heads of each of the cylinders B and B' is cast with and forms a part of the casting A, while the opposite heads B² and B³ of said cylinders are cast separate and secured in position upon the casting A' by the bolts E and E', having conical sections $e^3$ where they pass through the casting A and screwed into the heads B² and B³ without passing through the same, whereby a water-tight joint is secured, said bolts also serving to help secure the castings A and A' together, and also as guides for the pistons F and F', which are provided with sleeve-like hubs $h^2$ and $h^3$, respectively, of sufficient length to steady the pistons in their movement and to limit their strokes to the desired movement.

G is a shaft mounted in a vertical position in bearings formed one-half in each of the castings A and A', without extending through to the exterior thereof, and having secured thereon, near its upper end, the segmental lever G' and upon its lower end the valve or gate G², shown in full lines in Fig. 2 and in dotted lines in Fig. 6. The segmental lever G' has formed in its peripheral edge a notch the ends of which form shoulders $g$ and $g'$, and said lever projects into the interior of the cylinder B' through a slot formed for the purpose in the wall of said cylinder a distance about equal to the depth of said radial shoulders, as shown in Fig. 3. The valve or gate G² projects radially from the shaft G and has its outer vertical edge made V-shaped, as shown, the beveled sides of which engage alternately with seats formed for the purpose upon the inner or contiguous sides of the partitions $h$ and $h'$, to control the passage of water to the opposite ends of the cylinder B, said valve or gate G² being moved by the piston F' coming in contact with the shoulder $g$ or $g'$ of the segmental lever G'.

H is a sleeve-shaft fitted to and having its bearing upon the shaft G, and having formed upon its upper end the valve or gate H', and secured to its lower end the short lever $h^4$, which is connected at its movable end to the short arm of the segmental lever I, which is mounted upon and secured to the shaft I' mounted in bearings formed in the contiguous edges of the castings A and A', as shown. The peripheral edge of the segmental portion of the lever I has formed therein a notch or recess the ends of which form shoulders $i$ and $i'$, against which the piston F strikes in its movements to and fro in the cylinder B, to alternately move the valve or gate H' from one side of the induction-passage $b'$ to the other, for the purpose of controlling the admission of water to the opposite ends of the cylinder B', the valve or gate H' being constructed substantially like the gate G², and the segmental lever I projecting into the interior of the cylinder B through a slot formed in its wall for the purpose, substantially as above described, in connection with the cylinder B' and lever G'.

J and J' are two valves or gates having their bearings in the joint between the casting A² and the castings A and A', respectively, and adapted to alternately close the eduction-passages $c\,c'$ and $d\,d'$, said gates being connected together by means of the short levers J² and J³, secured to the lower ends of their axes within the chamber K and the link J⁴, so that a movement of either of said valves shall cause a movement of the other.

L and L' are a similar pair of valves or gates mounted in the same manner and connected by the levers L² and L³ and the link L⁴ within the chamber K, said gates being arranged to alternately close the induction-passages $e\,e'$ and $f\,f'$.

M is a cylindrical casing, cast with and forming a part of the casting A, to receive the registering apparatus, its outer end being closed by the metal ring M', carrying the glass disk M², and screwed into the cylinder M, as shown in Fig. 6.

N is the register-shaft, having its bearing in the hub A³, forming a part of the casting A and projecting into the chamber K, as shown in Fig. 6.

N' is a star-wheel firmly secured to the inner end of the shaft N in a position to be alternately acted upon by the arms $j$ and $j'$, which project radially from the sleeve-shaft H and vibrate therewith in different planes, the arm $j$ being so arranged as to come in contact with a tooth upon the under side of the star-wheel H, when the segmental lever I is moved in the direction indicated by the arrow and move said star-wheel about its axis a distance equal to one-half the distance between the centers of two contiguous teeth of said star-wheel, and the arm $j'$ being so arranged as to come in contact with a tooth upon the upper side of said star-wheel when the lever I is moved in the opposite direction, and move said wheel another step of equal length in the same direction.

The shaft N has firmly secured thereto, within the casing M, and in close proximity to the bearing for said shaft, the concavo-convex disk O, so fitted thereto as to make a water-tight joint between it and the shaft, to the periphery of which disk is secured, so as to revolve therewith, the glass chamber O', within which is placed the registering-dials, indexes, and operating-wheels, all supported upon a frame, $k$, that is pendent from the shaft N. This frame $k$, of nearly rectangular form, is made preferably of thin sheet metal, folded and bent as indicated in Fig. 1, and is fitted to hang loosely upon the shaft N, which revolves freely in the bearings of said frame as it hangs pendent by one corner therefrom, as shown, said frame being made of sufficient weight to resist the friction of the shaft N as it revolves in its bearings in said frame, and thus maintain its pendent position while the shaft N is being revolved. The frame $k$ has formed therein bearings for the worm-shaft $l$ and the shaft $m$, and has formed thereon or secured thereto the fixed index-fingers $n$ and $o$. The shaft $l$ has mounted upon one end thereof the worm-wheel $p$, and has formed upon its other end a screw-thread, which meshes into the teeth of the two wheels $q$ and $r$, mounted upon the shaft $m$, the wheel $q$ being fitted loosely upon said shaft, and having cut in its periphery a series of one hundred teeth, and is graduated upon its radial face into a circular scale of one hundred parts, while the wheel $r$ has formed in its periphery one hundred and one teeth, and is firmly secured to the shaft $m$, so as to revolve therewith and with the index-finger $s$, also firmly secured to the shaft $m$, but upon the opposite side of the wheel $q$ from the wheel $r$, as shown in Fig. 6. The worm-wheel $p$ also has graduated upon its upper radial face a circular scale of one hundred parts, and has formed in its periphery one hundred teeth, with which a worm, $n'$, formed upon the shaft N, engages to rotate said wheel, and through it the shaft $l$, which in turn imparts motion to the two wheels, $q$ and $r$, but at different speeds.

The operation of my invention is as follows: The several parts being in the position shown in the drawings, with both pistons F and F' at that end of their strokes which is within the casting A, and water being admitted through pipe D, the pressure of the head of water is exerted throughout the passages $a\,a'\,d^2$ and $b\,b'\,e^2$, tending to force the piston F' in the direction indicated by the arrow 2 and the piston F in the opposite direction; but as the piston F' cannot be moved farther in the direction of the pressure, and as the piston F is free to be moved in the direction in which the pressure is applied thereto, said piston F is moved along the cylinder B toward its opposite end, the water in front of said piston being discharged from the cylinder B through the passages $f^2\,f'\,f$ and discharge-pipe D'. When the piston F has moved about one-third of its stroke it comes in contact with the shoulder $i$ of the segmental lever I, and moves said lever I about its axis, and through it moves the lever $h^4$, sleeve H, and gate H', about the axis of the shaft G, changing the gate H' from the position shown in Fig. 4 in contact with the partition $h$ to the opposite angle in contact with the partition $h'$, thus closing the passage from $a'$ to $d^2$, and allowing the pressure of the incoming water to be exerted upon the gate J to move it about its axis to close the eduction-passage $c^2 c' c$, and open the passage $a a' c^2$, and through the levers $J^2 J^3$ and link $J^4$ to move the gate J' so as to open the eduction-passage $d^2 d' d$, when the piston F' will be moved in the direction opposite to that indicated by the arrow 2, the water in front of it escaping through the passage $d^2 d' d$ and the pipe D'. When the piston F' has moved about one-third of the length of its stroke it comes in contact with the shoulder $g$ of the segmental lever G' and moves it, the shaft G, and the valve or gate $G^2$ about the axis of the shaft G till the gate $G^2$ is moved from the position in contact with the partition $h'$ to a position in contact with the partition $h$, and thus closing the induction-passage $b b' e^2$ and leaving the gate L exposed to the direct pressure of the incoming water, which moves said gate around its axis into a position to open the induction-passage $b, b'$, and $f^2$ and close the eduction-passage $f^2 f' f$, and, through the levers $L^2$ and $L^3$ and the link $L^4$, moves the gate L' through a similar arc to open the eduction-passage $e^2 e' e$ and close the induction-passage $b b' e^2$ when the incoming water passes through the passage $b b' f^2$ into the cylinder and moves the piston F in a direction opposite to that of its last movement, during which it comes in contact with the shoulder $i'$ of the segmental arm of the lever I and moves it about its axis, and through it moves the gate H' to its former position, closing the passage $a a' c^2$, when the pressure of the water will move the gates J and J' into their former positions, so as to close the eduction-passage $d^2 d' d$ and open the eduction-passage $c^2 c' c$, when the incoming water will pass through the passage $a a' d^2$ into the cylinder B' and moves the piston F' in the direction of the arrow 2, during which movement the piston F' comes in contact with the shoulder $g'$ of the segmental lever G' and moves it with the shaft G and the gate $G^2$ about the axis of said shaft till the gate $G^2$ closes the passage $b b' f^2$, when the pressure of the incoming water acting upon the gate L' moves it and the gate L into positions to close the eduction-passage $c^2 e' e$ and open the eduction-passage $f^2 f' f$, which completes one complete cycle of movements, that may be repeated as long as water is supplied to the machine.

At each movement of the piston F toward the removable head of the cylinder B, and the consequent movement of the sleeve-shaft H about its axis, the arm $j$ projecting from said sleeve comes in contact with a tooth upon the under side of the star-wheel N' and turns it and the worm-shaft N a distance equal to one-half the circumferential distance between two contiguous teeth of said star-wheel, and at each return-stroke of the piston F the arm $j'$, vibrating in the opposite direction with the sleeve H, comes in contact with a tooth upon the upper side of the star-wheel N', and moves it and the shaft N about their axes an equal distance in the same direction. Thus it will be seen that at each double stroke of the piston F the star-wheel N' and worm-shaft N are moved one-fifth of a revolution, or one complete revolution to ten single strokes of said piston, and each revolution of the worm-shaft N causes a movement of the worm-wheel $p$ equal to one one-hundredths of a revolution, or one tooth, and one complete revolution of the wheel $p$ or one hundred revolutions of the shaft N will cause a movement of the wheels $q$ and $r$ of one tooth each, or one one-hundredth part and one one-hundred and first part of a revolution, respectively. The graduated scale upon the wheel $p$ passes beneath the fixed index-finger $n$, which enables the observer to tell the number of revolutions less than one hundred that the worm-shaft N has made. In like manner the graduated scale on the wheel $q$ passes beneath the fixed index-finger $o$, enabling the observer to tell the number of revolutions less than one hundred that the wheel $p$ has made.

The wheel $r$ has one tooth more in its periphery than the wheel $q$, and the index-finger $s$ is so arranged as to revolve with the wheel $r$; and, as the wheels $q$ and $r$ are rotated by the same worm, it follows that when the wheel $q$ has made one complete revolution the wheel $r$ and index-finger $s$ will have made one revolution, less one tooth; and hence if the two indexes $o$ and $s$ are placed together or both pointing at zero, when the machine is set in operation they will have separated one tooth when the wheel $q$ has made one revolution, or two teeth when said wheel $q$ has made two revolutions, and so on separating one tooth at each revolution of the wheel $q$, so that the observer can readily tell at a glance the number of revolutions less than one hundred that the wheel $q$ has made by the distance between the indexes $o$ and $s$.

It will be obvious from the foregoing that if the diameters of the cylinders and the strokes of the pistons are so proportioned that five double strokes of each piston shall discharge a unit of measurement—say, one quart or one gallon of water—then a movement of one tooth of the wheel $p$ will indicate that one quart or one gallon of water, as the case may be, has passed through the meter and been discharged. When the wheel $q$ has moved one tooth, or so that the index-finger $o$ points to division one of the graduated scale thereon, it will indicate that one hundred such units of water have passed through the meter and been discharged. When the index-finger $o$ points to zero on the scale and the index-finger $s$ points to division one on the same scale, it indicates that ten thousand such units of water have been discharged, and when the index-finger $o$ points to zero and the index-finger s points to ninety-nine on the scale, it will indicate that one million such units have been discharged.

The arrangement of the register within the glass case or chamber O' which revolves with the worm-shaft N and may be surrounded by water, enables me to dispense with the employment of a stuffing-box of any kind, whereby a great saving in friction is made and as a consequence a more perfect register is obtained, and at the same time the registering dials and indexes are plainly visible through the glass casing.

What I claim as new, and desire to secure by Letters Patent of the United States, is—

1. A registering mechanism suspended from the shaft by which it is operated, in combination with a glass case mounted upon and revolving with said operating-shaft and inclosing the registering mechanism, and a stationary casing inclosing the revolving glass case and provided with a glass front, substantially as and for the purposes described.

2. The combination, in a water-meter, of the shaft N, a registering mechanism pendent from and operated by said shaft, the glass case O', mounted upon and revolving with the shaft N and inclosing the registering mechanism, a reciprocating piston and mechanism connecting with the shaft N, and adapted to be acted upon by said piston to intermittently rotate the shaft N, substantially as and for the purposes described.

3. The combination of the shaft N, provided with the star-wheel N', a registering mechanism pendent from and operated by said shaft, the sleeve-shaft H provided with the radial arms $j$ and $j'$, the levers $h^4$ and I, and the piston F, all arranged and adapted to operate substantially as and for the purposes described.

4. The combination of the piston F, the segmental lever I, provided with shoulders $i$ and $i'$, the lever $h^4$, sleeve-shaft H, and the valve or gate H', all arranged and adapted to operate substantially as and for the purposes described.

5. The combination of the pistons F and F', the notched segmental levers G' and I, shaft G, sleeve-shaft H, lever $h^4$, and the gates $G^2$ and H', all arranged and adapted to operate substantially as and for the purposes described.

6. The valves or gates $G^2$ and H', arranged as set forth, and operated respectively by the pistons F' and F to open and close the induction-passages, in combination with the valves or gates J J' and L L', connected together in pairs and operated by the force of the incoming current of water to open and close the eduction-passages, substantially as described.

7. A water-meter case composed primarily of the three castings A, A', and $A^2$, packed at their joints by V-shaped tongues and grooves, in combination with the removable heads $B^2$ and $B^3$, and the clamping-bolts E and E', provided with the conical sections $e^3$, substantially as and for the purposes described.

8. The combination of the worm-shaft N, the metal disk O, the cylindrical chamber M, provided with the glass front $M^2$, the glass chamber O', attached to and adapted to revolve with the disk O and with the shaft N, and a registering mechanism contained within said glass chamber and pendent from and adapted to be operated by said worm-shaft, substantially as described.

9. The combination of the worm-shaft N, the frame $k$, pendent from said shaft and provided with the stationary or fixed index-fingers $n$ and $o$, the graduated worm-wheel $p$, the worm-shaft $l$, the differential worm-wheels $q$ and $r$, arranged to be operated by the worm-shaft $l$ at different speeds, the index-finger $s$, arranged to move with the wheel $r$, and the circular graduated scale on the wheel $q$, all adapted to operate substantially as and for the purposes described.

10. The casting $A^2$, provided with the passages $a$, $b$, $c$, $d$, $e$, and $f$, and the induction-orifice D and eduction-orifice D', in combination with the castings A and A', having formed therein the cylinders B and B' and passages $a'$, $b'$, $c^2$, $d^2$, $e^2$, and $f^2$, arranged relative to each other and to passages in the casting $A^2$, substantially as described.

Executed at New York city this 10th day of August, A. D. 1881.

SIDNEY W. HOAG, Sr.

Witnesses:
WM. H. RIBLET,
MORTIMER J. ENNIS.